US012309771B2

(12) United States Patent
Bin Sediq et al.

(10) Patent No.: US 12,309,771 B2
(45) Date of Patent: May 20, 2025

(54) WIRELESS COMMUNICATION UPLINK PRESCHEDULING WITH GUARANTEES

(71) Applicant: Telefonaktiebolaget LM Ericsson (publ), Stockholm (SE)

(72) Inventors: Akram Bin Sediq, Kanata (CA); Gunnar Larsson, Walnut Creek, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 280 days.

(21) Appl. No.: 17/917,348

(22) PCT Filed: May 6, 2020

(86) PCT No.: PCT/IB2020/054301
§ 371 (c)(1),
(2) Date: Oct. 6, 2022

(87) PCT Pub. No.: WO2021/220042
PCT Pub. Date: Nov. 4, 2021

(65) Prior Publication Data
US 2023/0156694 A1    May 18, 2023

Related U.S. Application Data (60) Provisional application No. 63/016,436, filed on Apr. 28, 2020.

(51) Int. Cl.
*H04W 72/1268* (2023.01)
*H04W 52/36* (2009.01)
*H04W 72/11* (2023.01)

(52) U.S. Cl.
CPC ..... *H04W 72/1268* (2013.01); *H04W 52/365* (2013.01); *H04W 72/11* (2023.01)

(58) Field of Classification Search
CPC ............. H04W 72/1268; H04W 72/11; H04W 52/365; H04W 72/14; H04W 72/04;
(Continued)

(56) References Cited

U.S. PATENT DOCUMENTS

| | | | |
|---|---|---|---|
| 2012/0127891 A1* | 5/2012 | Landstrom | H04W 72/1221 370/252 |
| 2017/0019919 A1* | 1/2017 | Liang | H04W 72/23 |
| 2017/0127433 A1* | 5/2017 | Lin | H04W 72/12 |

FOREIGN PATENT DOCUMENTS

| | | |
|---|---|---|
| EP | 2882249 A1 | 6/2015 |
| WO | 2014/056518 A1 | 4/2014 |
| WO | 2016/055472 A1 | 4/2016 |

OTHER PUBLICATIONS

International Search Report and Written Opinion dated Dec. 4, 2020 issued in PCT Application No. PCT/IB2020/054301, consisting of 16 pages.
(Continued)

*Primary Examiner* — Rushil P. Sampat
(74) *Attorney, Agent, or Firm* — Weisberg I.P. Law, P.A.

(57) ABSTRACT

A method implemented in a network node for scheduling uplink communications from a wireless device is provided. The method includes receiving, at the network node from a WD, a plurality of UL responses associated with UL scheduling. For each received UL response from the plurality of UL responses, a type of the received UL response is determined based at least in part on contents of the received UL response, including a regular UL grant and a wasted UL grant. For each received UL response from the plurality of UL responses, a UL scheduling aggressiveness parameter to control UL scheduling of the WD is determined. The UL scheduling aggressiveness parameter is based at least in part on the determined type of UL response. The method includes, optionally, performing UL scheduling of the WD
(Continued)

based on the updated UL scheduling aggressiveness parameter.

22 Claims, 3 Drawing Sheets

(58) Field of Classification Search
CPC . H04W 72/21; H04W 72/0446; H04W 72/23; H04W 76/048; H04W 76/28; H04W 88/02; H04L 69/324
See application file for complete search history.

(56) References Cited

OTHER PUBLICATIONS

3GPP TS 38.213 V15.5.0 (Mar. 2019); 3rd Generation Partnership Project; Technical Specification Group Radio Access Network; NR; Physical Layer Procedures for Control (Release 15), consisting of 104 pages.
Ramon A. Delgado et al., Fast Convergence Outer Loop Link Adaptation With Infrequent Updates In Steady State; 2017 IEEE 86th Vehicular Technology Conference (VTC-Fall), Toronto, ON, consisting of 5 pages.
3GPP TSG-RAN2 Meeting #94; R2-164079; Source: LG Electronics Inc.; Title: Support of Semi-Persistent Scheduling for PC5 Mode 1; Agenda Item: 8.2.4; Document for: Discussion and Decision; Nanjing, China, Apr. 11-15, 2016, consisting of 4 pages.
3GPP TSG-RAN2 Meeting #94; R2-164495; Source: LG Electronics Inc.; Title: TP on UL SPS Agreements and Other Agreements; Agenda Item: 8.11.1; Document for: Discussion and Decision; Nanjing, China, Apr. 11-15, 2016, consisting of 8 pages.
3GPP TSG-RAN WG1 Meeting #53bis; R1-082586; Source: Nokia Corporation, Nokia Siemens Networks; Title: Semi Persistent Scheduling Activation and False Positive Grants; Agenda Item: 4; Document for: Discussion and Decision; Warsaw, Poland, Jun. 30-Jul. 4, 2008, consisting of 3 pages.
Klaus I. Pedersen et al., Frequency Domain Scheduling for OFDMA with Limited and Noisy Channel Feedback; 2007 IEEE 66th Vehicular Technology Conference, Baltimore, MD, 2007, consisting of 5 pages.
Ashwin Sampath et al., On Setting Reverse Link Target SIR in a CDMA System; 1997 IEEE 47th Vehicular Technology Conference, Technology in Motion, Phoenix, AZ, USA, 1997, consisting of 5 pages.
Frank Schaich et al., Preliminary Results for Multi-Service Support in Link Solution Adaptation; Fantastic 5G, Deliverable D3.1; May 30, 2016, consisting of 213 pages.

* cited by examiner

WIRELESS COMMUNICATION UPLINK PRESCHEDULING WITH GUARANTEES

CROSS-REFERENCE TO RELATED APPLICATIONS

This application is a Submission Under 35 U.S.C. § 371 for U.S. National Stage Patent Application of International Application No.: PCT/IB2020/054301, filed May 6, 2020 entitled "WIRELESS COMMUNICATION UPLINK PRESCHEDULING WITH GUARANTEES," which claims priority to U.S. Provisional Application No. 63/016,436, filed Apr. 28, 2020, entitled "WIRELESS COMMUNICATION UPLINK PRESCHEDULING WITH GUARANTEES," the entireties of both of which are incorporated herein by reference.

TECHNICAL FIELD

Wireless communication networks and more particularly to methods and apparatuses for wireless communication uplink scheduling.

BACKGROUND

Wireless communication networks, such as those provided based on standards promulgated by the $3^{rd}$ Generation Partnership Project (3GPP) support, e.g., Long Term Evolution (LTE) and New Radio (NR) (NR is also referred to as 5G), include at least a network node and more than one wireless device (WD). In these networks, managed assignment of radio resources to the WD's by the network node is useful in order to minimize or even avoid communication collisions among those WDs communicating with the network node, e.g., ensuring two WD's do not use the same radio resource to communicate with the network node. These wireless communication networks typically include radio resources in the downlink (DL) and uplink (UL) directions. DL's carry signals from the network node to the WD's, while UL's carry signals from WD's to the network node.

One way to achieve collision-free UL scheduling, where more than one WD, e.g., user equipment, in the same cell do not transmit on the same radio resource, is by letting a network node, typically a base station, to coordinate UL scheduling and convey UL scheduling decisions to the WD's. Conveying the UL scheduling decisions to the WDs can be done in either a dynamic manner, i.e., every transmission time interval (TTI), or a semi-static manner. For instance, in 3GPP networks based on LTE, the network node, e.g., base station can dynamically convey an uplink resource assignment to a given WD by sending a UL grant on the physical downlink control channel (PDCCH) to the WD. The UL grant contains information about the radio resources that the WD is expected to use for transmitting its uplink data. The network node can also semi-statically allocate periodic resources to a WD in advance to reduce the control messages on PDCCH, which is called semi-persistent scheduling, e.g., a WD may be asked to transmit in a given radio resources every certain amount of time (msec). The network node can also deallocate the periodic resources allocated to the WD in a semi-static manner.

In order to make efficient UL resource allocation, it is helpful for the network node to know whether the WD has data to transmit, including, knowing how much data the WD has in its buffer to be transmitted. One approach for the WD to let the network node know that the WD has data to transmit is by sending a 1-bit scheduling request (SR) in a periodic SR resource that is assigned by the network node to the WD when the WD connects to the network node. A typical period for the SR resource in LTE is 10 msec, but other values are also allowed in 3GPP wireless communication standards. The use of SR transmissions translates into an added latency in the uplink as the WD needs to wait for the SR opportunity to inform the network node of UL data arrival. After the network node has successfully decoded the SR, the network node then schedules the WD with an uplink grant. Using SR alone, the network node cannot know exactly the amount of data that the WD has in its buffer. Thus, typically the network node sends a small UL grant which the WD can use to send buffer-status-report (BSR) to the network node in order to indicate a range of data that the WD has in its buffer which can be used by the network node for UL scheduling. This approach has the advantage that there is no UL wasted grants as the network node does not send an UL grant to a WD unless the network node knows that the WD has data to transmit to the network node. However, this approach has the disadvantage of increased latency as the network node needs to wait until the network node receives SR and BSR from the WD before the network node schedules the right UL grant that satisfies the WD's need. One way to overcome the disadvantage of increased latency of this approach is to give the WDs UL grants in advance without explicit request from the WD. This can be achieved by semi-persistent scheduling, explained above, or UL prescheduling, where a PDCCH UL grant is scheduled from the network node in advance, whether periodically or whenever a condition is met. According to early LTE releases, such as before 3GPP Release-14, WDs are mandated to transmit UL padding in response to UL grants even when the WDs do not have anything to transmit to the network node. This can result in excessive interference. UL grants that are sent by the network node to a WD that has no data to transmit to the network node are referred to as wasted UL grants, while UL grants that are sent to a WD which has data to transmit to the network node are referred to as regular UL grants hereafter.

One way to reduce the excessive interference described above is to configure a static parameter, for example a parameter called preschedulingDuration, where prescheduling is stopped if the network node does not receive any UL transmissions carrying useful data (i.e., not just UL padding) during the duration established by the preschedulingDuration parameter. In other words, the preschedulingDuration parameter controls the aggressiveness of prescheduling such that decreasing this parameter results in fewer wasted UL grants but worse latency and vice versa. However, tuning the preschedulingDuration parameter value is not straight-forward. Another way to reduce the excessive interference described above is to use machine learning to predict the probability that a WD has UL data to transmit to the network node and use that probability in deciding whether to schedule UL grants. For example, an UL grant is scheduled when the probability is greater than a threshold. However, adjustment of the threshold to result in an efficient grant environment is likewise challenging.

In other words, existing solutions are not easy to configure such that they do not result in large interference to neighboring cells. While preschedulingDuration can be adjusted to roughly reduce wasted UL grants, preschedulingDuration requires manual configuration to find a suitable value for this parameter to control the interference increase in neighboring cells, which is not easy to do. Moreover, for a given setting of preschedulingDuration, interference increase can be large or small depending on the load and the traffic profile of the users, both of which are time-varying. For example, if there is a single user in a cell with active intermittent UL transmissions, the number of UL wasted grants can be larger than a case when there are multiple users in the cell. In the former case, UL prescheduling grant will be prioritized more often than in the latter case where UL prescheduling grant will likely to have lower priority compared non-prescheduling grants. Thus, using preschedulingDuration alone to control the wasted grants is not efficient. Likewise, the threshold used in machine-learning-based solutions to reduce the excessive interference as described above is also not easy to configure.

SUMMARY

Some embodiments of the present disclosure advantageously provide methods, apparatuses and systems related to wireless communication uplink scheduling.

According to one aspect of the present disclosure, a method implemented in a network node for scheduling uplink communications from a wireless device is provided. The method includes receiving, at the network node from a WD, a plurality of UL responses associated with UL scheduling. For each received UL response from the plurality of UL responses, a type of the received UL response is determined based at least in part on contents of the received UL response. The type of received UL response include a regular UL grant and a wasted UL grant. In addition, for each received UL response from the plurality of UL responses, a UL scheduling aggressiveness parameter to control UL scheduling of the WD is determined. The UL scheduling aggressiveness parameter is based at least in part on the determined type of UL response. The method also includes, optionally, performing UL scheduling of the WD based on the updated UL scheduling aggressiveness parameter.

In some embodiments of this aspect, determining the UL scheduling aggressiveness parameter is applied to one of UL prescheduling, UL semi-persistent scheduling, and UL prescheduling based on machine learning. In some embodiments of this aspect, determining the UL scheduling aggressiveness parameter further includes determining a ratio of average number of wasted UL grants to average number of regular UL grants, and dynamically updating the UL scheduling aggressiveness parameter so that the ratio of average number of wasted UL grants to average number of regular UL grants trends towards a configurable target.

In some embodiments of this aspect, determining the UL scheduling aggressiveness parameter further includes determining an upStep parameter as an amount of increase in the UL scheduling aggressiveness parameter based on a product of a maxWastedToRegularGrantsRatio and a downStep, where the maxWastedToRegularGrantsRatio is a configurable parameter that denotes a target maximum ratio of wasted UL grants to regular UL grants, and the downStep is a configurable parameter specifying an amount of decrease in the UL scheduling aggressiveness parameter. The UL scheduling aggressiveness parameter is decremented by an amount equal to downStep for every received wasted UL grant, and the UL scheduling aggressiveness parameter is incremented by an amount equal to upStep for every received regular UL grant.

In some embodiments of this aspect, determining the UL scheduling aggressiveness parameter further includes determining an average number of wasted UL grants, and dynamically updating the UL scheduling aggressiveness parameter so that the average number of wasted UL grants tends towards a configurable target.

In some embodiments of this aspect, determining the UL scheduling aggressiveness parameter further includes, for every amount of time equal to a Transmission Time Interval (TTI) associated with the UL responses, determining nrofWastedGrantThisTti as a number of wasted UL grants occurring during the TTI, determining maxNrofWastedUlGrantsPerTti as a configurable parameter denoting a target maximum number of UL grants per TTI, and updating the UL scheduling aggressiveness parameter, preschedulingAggressiveness, expressed by: preschedulingAggressiveness=preschedulingAggressiveness+ki*(maxNrofWastedUlGrantsPerTti−nrofWastedGrantThisTti), where ki is an integrating factor from an integrator controller in the network node.

In some embodiments of this aspect, determining the UL scheduling aggressiveness parameter includes determining a total wasted UL grant power, where the total wasted UL grant power is an amount of power transmitted by a plurality of wireless devices to transmit wasted UL grants, and a total regular UL grant power, where the total regular UL grant power is an amount of power transmitted by the plurality of wireless devices to transmit regular UL grants. Determining the UL scheduling aggressiveness parameter further includes determining a ratio of total wasted UL grant power to total regular UL grant power, and dynamically updating the UL scheduling aggressiveness parameter so that the determined ratio trends towards a configurable target.

In some embodiments of this aspect, determining the UL scheduling aggressiveness parameter includes determining a upStep parameter as an amount of increase in the UL scheduling aggressiveness parameter based on a product of a maxWastedPwrToRegularPwrRatio and a downStep, where the maxWastedPwrToRegularPwrRatio is a configurable parameter that denotes a target maximum ratio of total power transmitted by a plurality of wireless devices to transmit wasted UL grants to power transmitted by the plurality of wireless devices to transmit regular UL grants, and the downStep is a configurable parameter specifying an amount of decrease in the UL scheduling aggressiveness parameter. For every received wasted UL grant, a power amount, wastedPwr, transmitted by the wireless device to transmit the wasted UL grant is determined, and the UL scheduling aggressiveness parameter is decremented by an amount equal to the product of downStep and wastedPwr. For every received regular UL grant, a power amount, regularPwr, transmitted by the wireless device to transmit the regular UL grant is determined, and the UL scheduling aggressiveness parameter is incremented by an amount equal to the product of upStep and regularPwr.

In some embodiments of this aspect, the determination of total wasted UL grant power and total regular UL grant power is based on power headroom report (PHR) reported by the wireless device. In some embodiments of this aspect, the determination of the UL scheduling aggressiveness parameter is further based on outputs generated by one of an integral controller and proportional-integral-derivative (PID) controller. In some embodiments of this aspect, the determined UL scheduling aggressiveness parameter is further based on one of a plurality of predefined classes of wireless device users. In some embodiments of this aspect, determining the UL scheduling aggressiveness parameter further includes adjusting the UL scheduling aggressiveness parameter to be within a configurable range for every received UL grant.

According to another aspect of the present disclosure, a network node is provided. The network node includes processing circuitry. The processing circuitry has a processor and a memory. The processing circuitry is configured to receive, at the network node from a WD, a plurality of UL responses associated with UL scheduling. The processing circuitry is further configured to, for each received UL response from the plurality of UL responses, determine a type of the received UL response based at least in part on contents of the received UL response, where the type of received UL response is one of a regular UL grant and a wasted UL grant, and determine a UL scheduling aggressiveness parameter to control UL scheduling of the WD, where the UL scheduling aggressiveness parameter is based at least in part on the determined type of UL response. The processing circuitry is further configured to, optionally, perform UL scheduling of the WD based on the updated UL scheduling aggressiveness parameter.

In some embodiments of this aspect, determining the UL scheduling aggressiveness parameter is applied to one of UL prescheduling, UL semi-persistent scheduling, and UL prescheduling based on machine learning. In some embodiments of this aspect, determining the UL scheduling aggressiveness parameter further includes determining a ratio of average number of wasted UL grants to average number of regular UL grants, and dynamically updating the UL scheduling aggressiveness parameter so that the ratio of average number of wasted UL grants to average number of regular UL grants trends towards a configurable target.

In some embodiments of this aspect, determining the UL scheduling aggressiveness parameter further includes determining an upStep parameter as an amount of increase in the UL scheduling aggressiveness parameter based on a product of a maxWastedToRegularGrantsRatio and a downStep, where the maxWastedToRegularGrantsRatio is a configurable parameter that denotes a target maximum ratio of wasted UL grants to regular UL grants, and the downStep is a configurable parameter specifying an amount of decrease in the UL scheduling aggressiveness parameter. The UL scheduling aggressiveness parameter is decremented by an amount equal to downStep for every received wasted UL grant, and the UL scheduling aggressiveness parameter is incremented by an amount equal to upStep for every received regular UL grant.

In some embodiments of this aspect, determining the UL scheduling aggressiveness parameter further includes determining an average number of wasted UL grants, and dynamically updating the UL scheduling aggressiveness parameter so that the average number of wasted UL grants tends towards a configurable target.

In some embodiments of this aspect, determining the UL scheduling aggressiveness parameter further includes, for every amount of time equal to a Transmission Time Interval (TTI) associated with the UL responses, determining nrofWastedGrantThisTti as a number of wasted UL grants occurring during the TTI, determining maxNrofWastedUlGrantsPerTti as a configurable parameter denoting a target maximum number of UL grants per TTI, and updating the UL scheduling aggressiveness parameter, preschedulingAggressiveness, expressed by: preschedulingAggressiveness=preschedulingAggressiveness+ki*(maxNrofWastedUlGrantsPerTti−nrofWastedGrantThisTti), where ki is an integrating factor from an integrator controller in the network node.

In some embodiments of this aspect, determining the UL scheduling aggressiveness parameter includes determining a total wasted UL grant power, where the total wasted UL grant power is an amount of power transmitted by a plurality of wireless devices to transmit wasted UL grants, and a total regular UL grant power, where the total regular UL grant power is an amount of power transmitted by the plurality of wireless devices to transmit regular UL grants. Determining the UL scheduling aggressiveness parameter further includes determining a ratio of total wasted UL grant power to total regular UL grant power, and dynamically updating the UL scheduling aggressiveness parameter so that the determined ratio trends towards a configurable target.

In some embodiments of this aspect, determining the UL scheduling aggressiveness parameter includes determining a upStep parameter as an amount of increase in the UL scheduling aggressiveness parameter based on a product of a maxWastedPwrToRegularPwrRatio and a downStep, where the maxWastedPwrToRegularPwrRatio is a configurable parameter that denotes a target maximum ratio of total power transmitted by a plurality of wireless devices to transmit wasted UL grants to power transmitted by the plurality of wireless devices to transmit regular UL grants, and the downStep is a configurable parameter specifying an amount of decrease in the UL scheduling aggressiveness parameter. For every received wasted UL grant, a power amount, wastedPwr, transmitted by the wireless device to transmit the wasted UL grant is determined, and the UL scheduling aggressiveness parameter is decremented by an amount equal to the product of downStep and wastedPwr. For every received regular UL grant, a power amount, regularPwr, transmitted by the wireless device to transmit the regular UL grant is determined, and the UL scheduling aggressiveness parameter is incremented by an amount equal to the product of upStep and regularPwr.

In some embodiments of this aspect, the determination of total wasted UL grant power and total regular UL grant power is based on power headroom report (PHR) reported by the wireless device. In some embodiments of this aspect, the determination of the UL scheduling aggressiveness parameter is further based on outputs generated by one of an integral controller and proportional-integral-derivative (PID) controller. In some embodiments of this aspect, the determined UL scheduling aggressiveness parameter is further based on one of a plurality of predefined classes of wireless device users. In some embodiments of this aspect, determining the UL scheduling aggressiveness parameter further includes adjusting the UL scheduling aggressiveness parameter to be within a configurable range for every received UL grant.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Some embodiments of the present disclosure provide methods and arrangements including prescheduling that is aware of load and traffic to dynamically adjust a parameter that controls the aggressiveness of the prescheduling. For instance, one such parameter is the preschedulingDuration, discussed below in detail. Another example of such parameter is the threshold used for binary machine learning based prediction. Yet another example is preschedulingPeriodicity, i.e., how often UL grants are sent. Other embodiments of the present disclosure provide methods and arrangements to control interference resulting from UL prescheduling or semi-persistent scheduling. The control of interference is advantageous since reduction in interference results in higher network performance.

Before describing in detail exemplary embodiments, it is noted that the embodiments reside primarily in combinations of apparatus components and processing steps related to dynamic machine learning decision threshold for resource allocation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-JOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "adjusting" may be considered to indicate increasing or decreasing. In some embodiments, the term "dynamically adjusting" may be considered to indicate continuously and/or periodically adjusting as in, as a contextual example, an outerloop of an allocation control loop.

In some embodiments, the term "allocation" may be considered to refer to a WD being allocated one or more resources for a transmission, such as, for example, allocating a radio resource on a channel for a signal to be transmitted to or from the WD (e.g., time-frequency resource for SRS on a physical uplink channel).

In some embodiments, the term "radio resource" is intended to indicate a frequency resource and/or a time resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the WD. For the UL communication, the transmitter is the WD and the receiver is the network node.

In some embodiments, the allocated radio resource may be allocated for a particular signal and on a particular channel. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) or a physical uplink control channel (PUCCH). In some embodiments, the channel may be a downlink channel, such as, a physical downlink control channel (PDCCH) or a physical downlink shared channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for using one or more dynamic machine learning decision thresholds for resource allocation.

Figure 1:
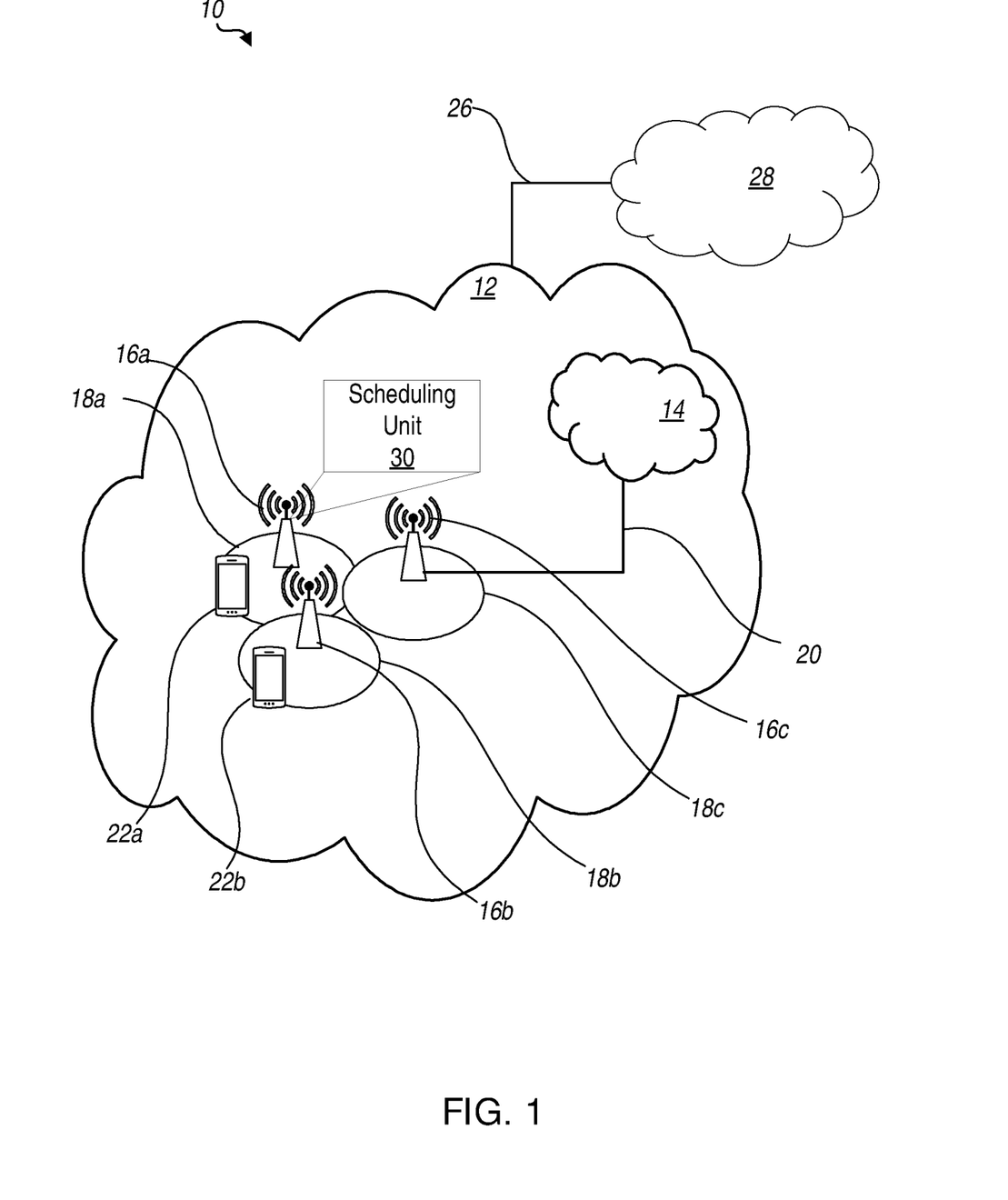
FIG. 1 is a schematic diagram of an example network architecture illustrating a communication system according to the principles in the present disclosure.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The connection 26 may extend directly from the access network 12 and/or core network 14 or may extend via an optional intermediate network 28. The intermediate network 28 may be one of, or a combination of more than one of, a public, private or hosted network. The intermediate network 28, if any, may be a backbone network or the Internet. In some embodiments, the intermediate network 28 may comprise two or more sub-networks (not shown).

A network node 16 is configured to include a scheduling unit 30 which is configured to cause the network node to determine a UL scheduling aggressiveness parameter to control UL scheduling of a WD, the UL scheduling aggressiveness parameter being based at least in part on a determined type of UL response.

Example implementations, in accordance with an embodiment, of the WD 22 and network node 16 discussed in the preceding paragraphs will now be described with reference to FIG. 2.

The communication system 10 further includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 60 with a WD 22 located in a coverage area 18 served by the network node 16. The radio interface 36 may be formed as or may include, for example, one or more RF transmitters, one or more RF receivers, and/or one or more RF transceivers.

In the embodiment shown, the hardware 32 of the network node 16 further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 42, or stored in external memory (e.g., database, storage array, network storage device, etc.) accessible by the network node 16 via an external connection. The software 44 may be executable by the processing circuitry 38. The processing circuitry 38 may be configured to control any of the methods and/or processes described herein and/or to cause such methods, and/or processes to be performed, e.g., by network node 16. Processor 40 corresponds to one or more processors 40 for performing network node 16 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to network node 16. For example, processing circuitry 38 of the network node 16 may include scheduling unit 30 configured to perform network node methods discussed herein, such as the methods discussed with reference to FIG. 3 as well as other figures.

The communication system 10 further includes the WD 22 already referred to. The WD 22 may have hardware 46 that may include a radio interface 48 configured to set up and maintain a wireless connection 60 with a network node 16 serving a coverage area 18 in which the WD 22 is currently located. The radio interface 48 may be formed as or may include, for example, one or more RF transmitters, one or more RF receivers, and/or one or more RF transceivers.

The hardware 46 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22. The client application 58 may interact with the user to generate the user data that it provides.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22. For example, the processing circuitry 50 of the wireless device 22 may be configured to use resources and/or receive and/or transmit on radio resources (e.g., physical layer resources, such as, physical downlink control channel, physical downlink shared channel, physical uplink control channel and/or physical uplink shared channel, etc.) that are allocated to the WD 22 using one or more of the techniques disclosed herein.

Figure 2:
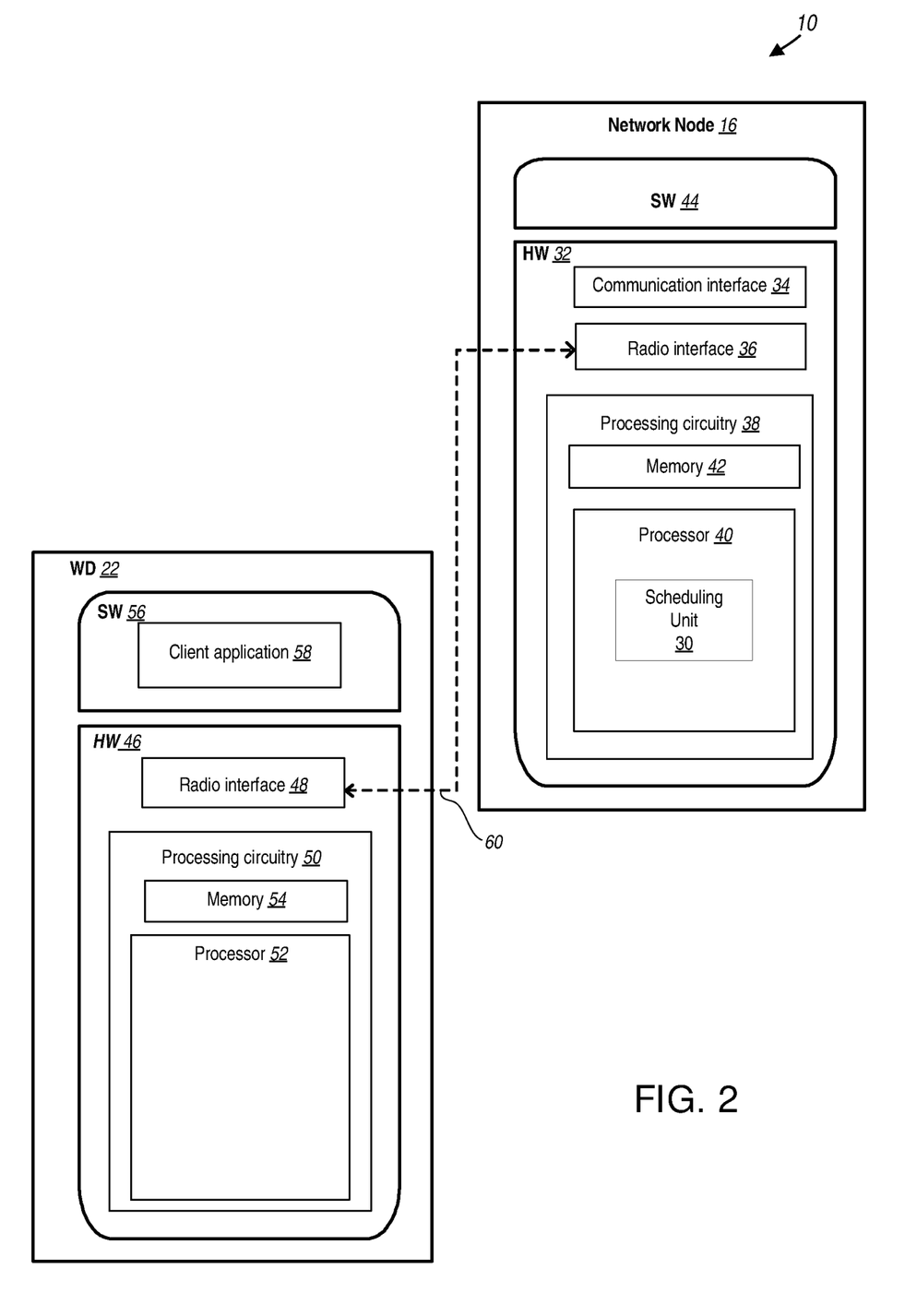
FIG. 2 is a block diagram of a network node in communication with a wireless device over an at least partially wireless connection according to some embodiments of the present disclosure.

In some embodiments, the inner workings of the network node 16 and WD 22, may be as shown in FIG. 2 and independently, the surrounding network topology may be that of FIG. 1.

Although FIGS. 1 and 2 show various "units" such as scheduling unit 30 as being within a processor, it is contemplated that these units may be implemented such that a portion of the unit is stored in a corresponding memory within the processing circuitry. In other words, the units may be implemented in hardware or in a combination of hardware and software within the processing circuitry.

In addition, although FIGS. 1 and 2 show scheduling unit 30 as being with the network node 16, it is contemplated that the network node 16 may include only one of these units.

Figure 3:
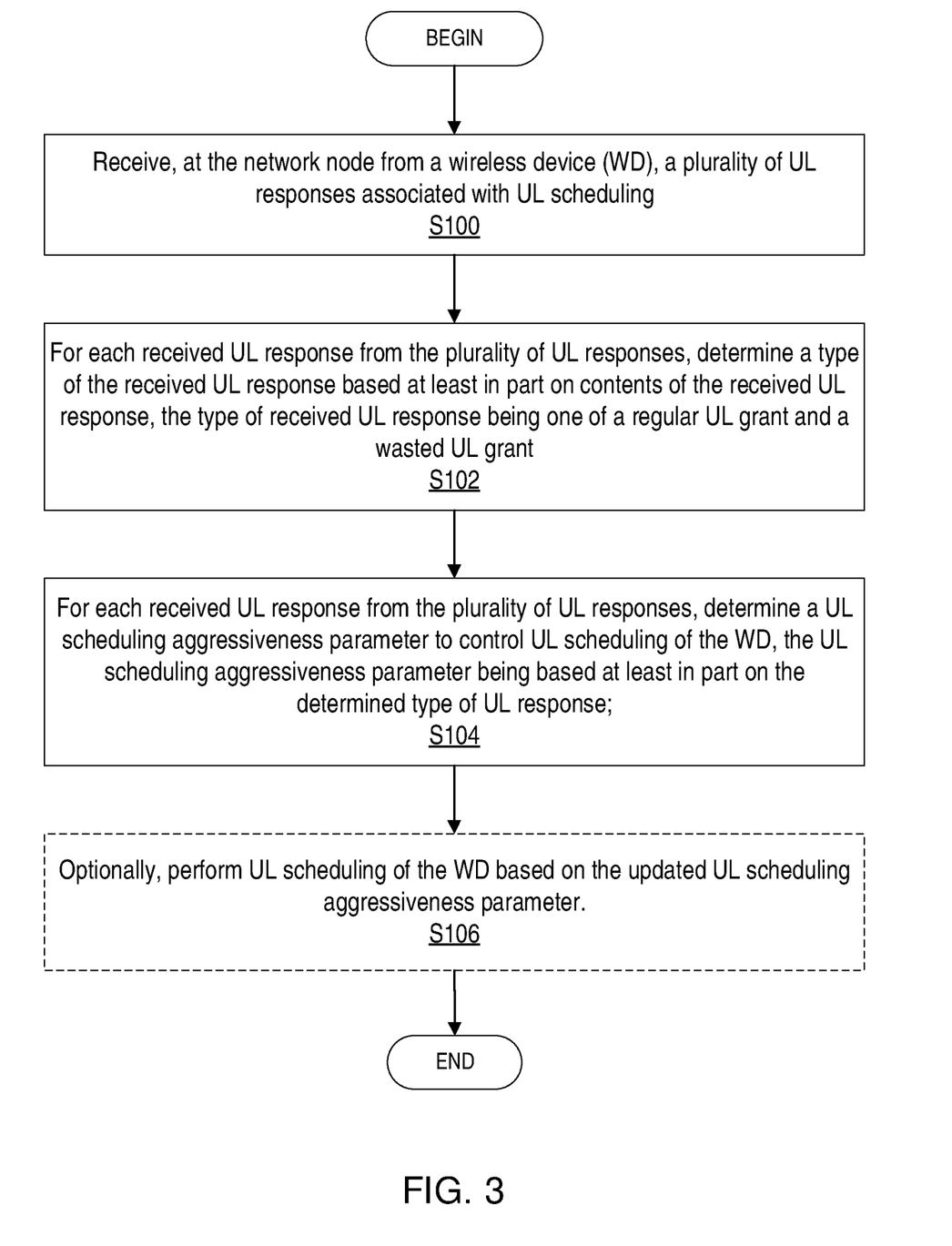
FIG. 3 is a flowchart of an example method for a network node for scheduling UL communications from a wireless device according to one embodiment of the present disclosure.

FIG. 3 is a flowchart of an example process in a network node 16 for method for a network node for scheduling UL communications from a wireless device according to some embodiments of the present disclosure. One or more Blocks and/or functions and/or methods performed by the network node 16 may be performed by one or more elements of network node 16 such as via scheduling unit 30 in processing circuitry 38, processor 40, communication interface 34, radio interface 36, etc. according to the example method. The example method includes receiving, at the network node from a WD (Block S100), such as via scheduling unit 30, processing circuitry 38, processor 40, communication interface 34 and/or radio interface 36, a plurality of UL responses associated with UL scheduling. The method includes, for each received UL response from the plurality of UL responses, determining (Block S102), such as via scheduling unit 30, processing circuitry 38, processor 40, communication interface 34 and/or radio interface 36, a type of the received UL response based at least in part on contents of the received UL response, the type of received UL response being one of a regular UL grant and a wasted UL grant. In addition, the example method includes, for each received UL response from the plurality of UL responses, determining (Block S104), such as via scheduling unit 30, processing circuitry 38, processor 40, communication interface 34 and/or radio interface 36, a UL scheduling aggressiveness parameter to control UL scheduling of the WD, the UL scheduling aggressiveness parameter being based at least in part on the determined type of UL response. Optionally, the method includes performing, (Block S106), such as via scheduling unit 30, processing circuitry 38, processor 40, communication interface 34 and/or radio interface 36, UL scheduling of the WD based on the updated UL scheduling aggressiveness parameter.

In some embodiments of this aspect, determining the UL scheduling aggressiveness parameter is applied, such as via scheduling unit 30, processing circuitry 38, processor 40, communication interface 34 and/or radio interface 36, to one of UL prescheduling, UL semi-persistent scheduling, and UL prescheduling based on machine learning. In some embodiments of this aspect, determining the UL scheduling aggressiveness parameter further includes determining, such as via scheduling unit 30, processing circuitry 38, processor 40, communication interface 34 and/or radio interface 36, a ratio of average number of wasted UL grants to average number of regular UL grants, and dynamically updating the UL scheduling aggressiveness parameter so that the ratio of average number of wasted UL grants to average number of regular UL grants trends towards a configurable target.

In some embodiments of this aspect, determining the UL scheduling aggressiveness parameter further includes determining, such as via scheduling unit 30, processing circuitry 38, processor 40, communication interface 34 and/or radio interface 36, an upStep parameter as an amount of increase in the UL scheduling aggressiveness parameter based on a product of a maxWastedToRegularGrantsRatio and a downStep, where the maxWastedToRegularGrantsRatio is a configurable parameter that denotes a target maximum ratio of wasted UL grants to regular UL grants, and the downStep is a configurable parameter specifying an amount of decrease in the UL scheduling aggressiveness parameter. The UL scheduling aggressiveness parameter is decremented, such as via scheduling unit 30, processing circuitry 38, processor 40, communication interface 34 and/or radio interface 36, by an amount equal to downStep for every received wasted UL grant, and the UL scheduling aggressiveness parameter is incremented by an amount equal to upStep for every received regular UL grant.

In some embodiments of this aspect, determining the UL scheduling aggressiveness parameter further includes determining, such as via scheduling unit 30, processing circuitry 38, processor 40, communication interface 34 and/or radio interface 36, an average number of wasted UL grants, and dynamically updating, such as via scheduling unit 30, processing circuitry 38, processor 40, communication interface 34 and/or radio interface 36, the UL scheduling aggressiveness parameter so that the average number of wasted UL grants tends towards a configurable target.

In some embodiments of this aspect, determining the UL scheduling aggressiveness parameter further includes, for every amount of time equal to a Transmission Time Interval (TTI) associated with the UL responses, determining, such as via scheduling unit 30, processing circuitry 38, processor 40, communication interface 34 and/or radio interface 36, nrofWastedGrantThisTti as a number of wasted UL grants occurring during the TTI, determining, such as via scheduling unit 30, processing circuitry 38, processor 40, communication interface 34 and/or radio interface 36, maxNrofWastedUlGrantsPerTti as a configurable parameter denoting a target maximum number of UL grants per TTI, and updating, such as via scheduling unit 30, processing circuitry 38, processor 40, communication interface 34 and/or radio interface 36, the UL scheduling aggressiveness parameter, preschedulingAggressiveness, expressed by: preschedulingAggressiveness=preschedulingAggressiveness+ki*(maxNrofWastedUlGrantsPerTti−nrofWastedGrantThisTti), where ki is an integrating factor from an integrator controller in the network node.

In some embodiments of this aspect, determining the UL scheduling aggressiveness parameter includes determining, such as via scheduling unit 30, processing circuitry 38, processor 40, communication interface 34 and/or radio interface 36, a total wasted UL grant power, where the total wasted UL grant power is an amount of power transmitted by a plurality of wireless devices 22 to transmit wasted UL grants, and a total regular UL grant power, where the total regular UL grant power is an amount of power transmitted by the plurality of wireless devices 22 to transmit regular UL grants. Determining the UL scheduling aggressiveness parameter further includes determining, such as via scheduling unit 30, processing circuitry 38, processor 40, communication interface 34 and/or radio interface 36, a ratio of total wasted UL grant power to total regular UL grant power, and dynamically updating, such as via scheduling unit 30, processing circuitry 38, processor 40, communication interface 34 and/or radio interface 36, the UL scheduling aggressiveness parameter so that the determined ratio trends towards a configurable target.

In some embodiments of this aspect, determining the UL scheduling aggressiveness parameter includes determining, such as via scheduling unit 30, processing circuitry 38, processor 40, communication interface 34 and/or radio interface 36, a upStep parameter as an amount of increase in the UL scheduling aggressiveness parameter based on a product of a maxWastedPwrToRegularPwrRatio and a downStep, where the maxWastedPwrToRegularPwrRatio is a configurable parameter that denotes a target maximum ratio of total power transmitted by a plurality of wireless devices 22 to transmit wasted UL grants to power transmitted by the plurality of wireless devices 22 to transmit regular UL grants, and the downStep is a configurable parameter specifying an amount of decrease in the UL scheduling aggressiveness parameter. For every received wasted UL grant, a power amount, wastedPwr, transmitted by the wireless device to transmit the wasted UL grant is determined, such as via scheduling unit 30, processing circuitry 38, processor 40, communication interface 34 and/or radio interface 36, and the UL scheduling aggressiveness parameter is decremented, such as via scheduling unit 30, processing circuitry 38, processor 40, communication interface 34 and/or radio interface 36, by an amount equal to the product of downStep and wastedPwr. For every received regular UL grant, a power amount, regularPwr, transmitted by the wireless device 22 to transmit the regular UL grant is determined, such as via scheduling unit 30, processing circuitry 38, processor 40, communication interface 34 and/or radio interface 36, and the UL scheduling aggressiveness parameter is incremented, such as via scheduling unit 30, processing circuitry 38, processor 40, communication interface 34 and/or radio interface 36, by an amount equal to the product of upStep and regularPwr.

In some embodiments of this aspect, the determination of total wasted UL grant power and total regular UL grant power is based on power headroom report (PHR) reported by the wireless device. In some embodiments of this aspect, the determination of the UL scheduling aggressiveness parameter is further based on outputs generated, such as via scheduling unit 30, processing circuitry 38, processor 40, communication interface 34 and/or radio interface 36, by one of an integral controller and proportional-integral-derivative (PID) controller. In some embodiments of this aspect, the determined UL scheduling aggressiveness parameter is further based on one of a plurality of predefined classes of wireless device 22 users. In some embodiments of this aspect, determining the UL scheduling aggressiveness parameter further includes adjusting, such as via scheduling unit 30, processing circuitry 38, processor 40, communication interface 34 and/or radio interface 36, the UL scheduling aggressiveness parameter to be within a configurable range for every received UL grant.

Having described the general process flow of arrangements of the disclosure and having provided examples of hardware and software arrangements for implementing the processes and functions of the disclosure, the sections below provide details and examples of arrangements for wireless communication uplink scheduling, which may be implemented by the network node 16 and/or wireless device 22. Some embodiments provide one or more techniques for wireless communication uplink scheduling to one or more WDs 22.

Some embodiments provide for use UL prescheduling to dynamically adjust a prescheduling aggressiveness parameter for a cell according to load and traffic. The prescheduling aggressiveness parameter controls aggressiveness of prescheduling such that decreasing the prescheduling aggressiveness parameter results in fewer wasted grants, but worse latency and vice versa. For example, one such parameter is the preschedulingDuration, where prescheduling is stopped if there are no UL transmissions from the WD carrying useful data (i.e., not just UL padding) during a period equal to or greater than the preschedulingDuration. Another example of such parameter is a threshold used for machine learning based prescheduling where a machine learning model produces a probability or a score that measures the likelihood of a wasted grant. In this example, prescheduling occurs if the probability or the score is below a threshold. Yet another example of such parameter is prescheduling frequency, defined as a number of prescheduling grants per second.

In one embodiment, the prescheduling aggressiveness parameter may be dynamically updated, for example by the network node 16, such that a ratio of average number of wasted UL grants to average number of regular UL grants is below a configurable threshold. The algorithm is described below:

Algorithm parameters:
  maxWastedToRegularGrantsRatio: configurable parameter that denotes the maximum ratio of wasted UL grants to regular UL grants
  downStep: a configurable parameter denoting the amount of decrease in prescheduling aggressiveness parameter (default value is 0.01)
  upStep: the amount of increase in prescheduling aggressiveness parameter given by upStep=maxWastedToRegularGrantsRatio×downStep maxPreschudlingAggressiveness: a configurable parameter denoting maximum prescheduling aggressiveness parameter
  minPreschudlingAggressiveness: a configurable parameter denoting minimum prescheduling aggressiveness parameter
Output: preschedulingAggressiveness
Execution:
  At reception of each PUSCH transmission in response to UL grants,
    If it is a wasted grant, i.e., PUSCH transmission contains only padding due UL prescheduling:
      preschedulingAggressiveness:=preschedulingAggressiveness−downStep
    Else (i.e., it is a useful grant),
      preschedulingAggressiveness:=preschedulingAggressiveness+upStep
    preschedulingAggressiveness:=min(max(preschedulingAggressiveness, minPreschudlingAggressiveness), maxPreschudlingAggressiveness)
  Return: preschedulingAggressiveness or a quantized version of preschedulingAggressiveness.

In another embodiment, the prescheduling aggressiveness parameter may be dynamically updated, for example by the network node 16, such that the average number of wasted UL grants is below a configurable threshold. The algorithm is described below:
Define:
  maxNrofWastedUlGrantsPerSec: configurable parameter that denotes the maximum average number of wasted UL grants per second that can be tolerated
  ki: a configurable parameter denoting the integrator controller
  maxNrofWastedUlGrantsPerTti=maxNrofWastedUlGrantsPerSec*TtiDuration
  maxPreschudlingAggressiveness: a configurable parameter denoting maximum prescheduling aggressiveness parameter
  minPreschudlingAggressiveness: a configurable parameter denoting minimum prescheduling aggressiveness parameter
Execution:
  Every TTI, the number of wasted grants is calculated (nrofWastedGrantThisTti)
  preschedulingAggressiveness:=preschedulingAggressiveness+ki*(maxNrofWastedUlGrantsPerTti−nrofWastedGrantThisTti)

preschedulingAggressiveness:=min(max(preschedulingAggressiveness, minPreschudlingAggressiveness), maxPreschudlingAggressiveness)

Return: preschedulingAggressiveness or a quantized version of preschedulingAggressiveness In another embodiment, the prescheduling aggressiveness parameter is dynamically updated, for example by the network node 16, such that the ratio of estimated total wasted UL power (used for wasted UL grants) to total regular UL power (used for regular UL grants) is below a configurable threshold. The algorithm is described below:

Algorithm parameters:
maxWastedPwrToRegularPwrRatio: configurable parameter that denotes the maximum ratio of wasted UL grants to regular UL grants
downStep: a configurable parameter denoting the amount of decrease in prescheduling aggressiveness parameter (default value is 0.01)
upStep: the amount of increase in prescheduling aggressiveness parameter given by $$upStep = maxWastedPwrToRegularPwrRatio \times downStep$$

maxPreschudlingAggressiveness: a configurable parameter specifying maximum prescheduling aggressiveness parameter
minPreschudlingAggressiveness: a configurable parameter specifying minimum prescheduling aggressiveness parameter
Output: preschedulingAggressiveness or quantized version of preschedulingAggressiveness
Execution:
At reception of each PUSCH transmission in response to UL grants,
If it is a wasted grant, i.e., PUSCH transmission contains only padding due UL prescheduling:
Estimate the power used to transmit the UL grant in linear scale (wastedPwr)
preschedulingAggressiveness:=preschedulingAggressiveness−downStep*wastedPwr
Else (i.e., it is a useful grant),
Estimate the power used to transmit the UL grant in linear scale (regularPwr)
preschedulingAggressiveness:=preschedulingAggressiveness+upStep*regularPwr
preschedulingAggressiveness:=min(max(preschedulingAggressiveness, minPreschudlingAggressiveness), maxPreschudlingAggressiveness)
Return: preschedulingAggressiveness or a quantized version of preschedulingAggressiveness A network node 16 of the present disclosure may implement any method to estimate transmitted power used by a WD 22 to transmit a UL grant. One of these methods is to use power headroom report (PHR) reported by the WD 22 to estimate pathloss, which can be used to estimate the UL power used by the WD 22 for a given number of resource blocks.

Although the algorithms described above may use an integral controller due to simplicity and efficacy, in some embodiments, the algorithms described above may readily use more advanced controllers in straightforward manner, such as proportional-integral-derivative (PID) controllers.

Although the term prescheduling is used in this disclosure, in some embodiments, the algorithms described above can be applied to semi-persistent scheduling in a straightforward manner. For instance, an aggressiveness parameter for semi-persistent scheduling can be a semi-persistent duration, defined similarly to prescheduling duration, i.e., where semi-persistent scheduling is stopped if there are no UL transmissions from the WD carrying useful data (i.e., not just UL padding) during a period equal to or greater than the semi-persistent duration. Semi-persistent duration can be dynamically adjusted using any of the algorithms described in the present disclosure. The same can be said about semi-persistent periodicity, i.e., how often the WD can send ULs. The same can be also said about the threshold to be used for machine learning based algorithm.

In another embodiment, a network node may classify users in multiple M priority classes (e.g., based on user subscription package) and apply the algorithms described in the present disclosure M times for each set of user class, where each algorithm run may have different parameter settings of any of maxWastedToRegularGrantsRatio, maxNrofWastedUlGrantsPerSec, maxWastedPwrToRegularPwrRatio, downStep, and ki. For example, a higher priority WD set may have a higher maxWastedToRegularGrantsRatio compared to a lower priority WD set.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node for scheduling uplink (UL) communications from a wireless device, the method comprising:
   receiving, at the network node from a wireless device (WD), a plurality of UL responses associated with UL scheduling;
   for each received UL response from the plurality of UL responses:
      determining a type of the received UL response based at least in part on contents of the received UL response, the type of received UL response being one of a regular UL grant and a wasted UL grant; and
      determining a UL scheduling aggressiveness parameter to control UL scheduling of the WD, the UL scheduling aggressiveness parameter being based at least in part on the determined type of UL response, determining the UL scheduling aggressiveness parameter comprising:
         determining a ratio of average number of wasted UL grants to average number of regular UL grants; and
         dynamically updating the UL scheduling aggressiveness parameter so that the ratio of average number of wasted UL grants to average number of regular UL grants trends towards a configurable target; and
   performing UL scheduling of the WD based on the updated UL scheduling aggressiveness parameter.

2. The method of claim 1, wherein the UL scheduling aggressiveness parameter is applied to one of UL prescheduling, UL semi-persistent scheduling, and UL prescheduling based on machine learning.

3. The method of claim 1, wherein determining the UL scheduling aggressiveness parameter further comprises:
   determining an upStep parameter as an amount of increase in the UL scheduling aggressiveness parameter based on a product of a maxWastedToRegularGrantsRatio and a downStep, the maxWastedToRegularGrantsRatio being a configurable parameter that denotes a target maximum ratio of wasted UL grants to regular UL grants, the downStep being a configurable parameter specifying an amount of decrease in the UL scheduling aggressiveness parameter;
   decrementing the UL scheduling aggressiveness parameter by an amount equal to downStep for every received wasted UL grant; and
   incrementing the UL scheduling aggressiveness parameter by an amount equal to upStep for every received regular UL grant.

4. The method of claim 1, wherein determining the UL scheduling aggressiveness parameter further comprises:
   determining an average number of wasted UL grants; and
   dynamically updating the UL scheduling aggressiveness parameter so that the average number of wasted UL grants tends towards a configurable target.

5. The method of claim 1, wherein determining the UL scheduling aggressiveness parameter further comprises:
   for every amount of time equal to a Transmission Time Interval (TTI) associated with the UL responses:
      determining nrofWastedGrantThisTti as a number of wasted UL grants occurring during the TTI;
      determining maxNrofWastedUlGrantsPerTti as a configurable parameter denoting a target maximum number of UL grants per TTI; and
      updating the UL scheduling aggressiveness parameter, preschedulingAggressiveness, expressed by:

preschedulingAggressiveness=preschedulingAggressiveness+ ki*(maxNrofWastedUlGrantsPerTti−nrofWastedGrantThisTti), ki being an integrating factor from an integrator controller in the network node.

6. The method of claim 1, wherein determining the UL scheduling aggressiveness parameter comprises:
   determining a total wasted UL grant power, the total wasted UL grant power being an amount of power transmitted by a plurality of wireless devices to transmit wasted UL grants, and a total regular UL grant power, the total regular UL grant power being an amount of power transmitted by the plurality of wireless devices to transmit regular UL grants;

determining a ratio of total wasted UL grant power to total regular UL grant power; and dynamically updating the UL scheduling aggressiveness parameter so that the determined ratio trends towards a configurable target.

7. The method of claim 1, wherein determining the UL scheduling aggressiveness parameter includes:

determining a upStep parameter as an amount of increase in the UL scheduling aggressiveness parameter based on a product of a maxWastedPwrToRegularPwrRatio and a downStep, the maxWastedPwrToRegularPwrRatio being a configurable parameter that denotes a target maximum ratio of total power transmitted by a plurality of wireless devices to transmit wasted UL grants to power transmitted by the plurality of wireless devices to transmit regular UL grants, the downStep being a configurable parameter specifying an amount of decrease in the UL scheduling aggressiveness parameter;

for every received wasted UL grant:
determining a power amount, wastedPwr, transmitted by the wireless device to transmit the wasted UL grant; and
decrementing the UL scheduling aggressiveness parameter by an amount equal to the product of downStep and wastedPwr; and for every received regular UL grant:
determining a power amount, regularPwr, transmitted by the wireless device to transmit the regular UL grant; and
incrementing the UL scheduling aggressiveness parameter by an amount equal to the product of upStep and regularPwr.

8. The method of claim 6, wherein the determination of total wasted UL grant power and total regular UL grant power is based on power headroom report (PHR) reported by the wireless device.

9. The method of claim 1, wherein the determination of the UL scheduling aggressiveness parameter is further based on outputs generated by one of an integral controller and proportional-integral-derivative (PID) controller.

10. The method of claim 1, wherein the determined UL scheduling aggressiveness parameter is further based on one of a plurality of predefined classes of wireless device users.

11. The method of claim 1, wherein determining the UL scheduling aggressiveness parameter further comprises:
adjusting the UL scheduling aggressiveness parameter to be within a configurable range for every received UL grant.

12. A network node for a wireless communication network, the network node comprising:
processing circuitry, the processing circuitry having a processor and a memory, the processing circuitry configured to:
receive, at the network node from a WD, a plurality of UL responses associated with UL scheduling;
for each received UL response from the plurality of UL responses:
determine a type of the received UL response based at least in part on contents of the received UL response, the type of received UL response being one of a regular UL grant and a wasted UL grant; and
determine a UL scheduling aggressiveness parameter to control UL scheduling of the WD, the UL scheduling aggressiveness parameter being based at least in part on the determined type of UL response, determining the UL scheduling aggressiveness parameter comprising:
determining a ratio of average number of wasted UL grants to average number of regular UL grants; and
dynamically updating the UL scheduling aggressiveness parameter so that the ratio of average number of wasted UL grants to average number of regular UL grants trends towards a configurable target; and
perform UL scheduling of the WD based on the updated UL scheduling aggressiveness parameter.

13. The network node of claim 12, wherein the UL scheduling aggressiveness parameter is applied to one of UL prescheduling, UL semi-persistent scheduling, and UL prescheduling based on machine learning.

14. The network node of claim 12, wherein determining the UL scheduling aggressiveness parameter further comprises:
determining an upStep parameter as an amount of increase in the UL scheduling aggressiveness parameter based on a product of a maxWastedToRegularGrantsRatio and a downStep, the maxWastedToRegularGrantsRatio being a configurable parameter that denotes a target maximum ratio of wasted UL grants to regular UL grants, the downStep being a configurable parameter specifying an amount of decrease in the UL scheduling aggressiveness parameter;
decrementing the UL scheduling aggressiveness parameter by an amount equal to downStep for every received wasted UL grant; and
incrementing the UL scheduling aggressiveness parameter by an amount equal to upStep for every received regular UL grant.

15. The network node of claim 12, wherein determining the UL scheduling aggressiveness parameter further comprises:
determining an average number of wasted UL grants; and
dynamically updating the UL scheduling aggressiveness parameter so that the average number of wasted UL grants trends towards a configurable target.

16. The network node of claim 12, wherein determining the UL scheduling aggressiveness parameter further comprises:
for every amount of time equal to a Transmission Time Interval (TTI) associated with the UL responses:
determining nrofWastedGrantThisTti as a number of wasted UL grants occurring during the TTI;
determining maxNrofWastedUlGrantsPerTti as a configurable parameter denoting a target maximum number of UL grants per TTI; and
updating the UL scheduling aggressiveness parameter, preschedulingAggressiveness, expressed by:

$$preschedulingAggressiveness = preschedulingAggressiveness + ki^*(maxNrofWastedUlGrantsPerTti - nrofWastedGrantThisTti),$$

ki being an integrating factor from an integrator controller in the network node.

17. The network node of claim 12, wherein determining the UL scheduling aggressiveness parameter comprises:
determining a total wasted UL grant power, the total wasted UL grant power being an amount of power transmitted by a plurality of wireless device to transmit wasted UL grants, and a total regular UL grant power, the total regular UL grant power being an amount of power consumed by the plurality of wireless device to transmit regular UL grants;

determining a ratio of total wasted UL grant power to total regular UL grant power; and dynamically updating the UL scheduling aggressiveness parameter so that the determined ratio tends towards a configurable target.

18. The network node of claim 12, wherein determining the UL scheduling aggressiveness parameter includes:

determining a upStep parameter as an amount of increase in the UL scheduling aggressiveness parameter based on a product of a maxWastedPwrToRegularPwrRatio and a downStep, the maxWastedPwrToRegularPwrRatio being a configurable parameter that denotes a target maximum ratio of total power transmitted by a plurality of wireless devices to transmit wasted UL grants to power transmitted by the plurality of wireless devices to transmit regular UL grants, the downStep being a configurable parameter specifying an amount of decrease in the UL scheduling aggressiveness parameter;

for every received wasted UL grant:
  determining a power amount, wastedPwr, transmitted by the wireless device to transmit the wasted UL grant;
  decrementing the UL scheduling aggressiveness parameter by an amount equal to the product of downStep and wastedPwr; and for every received regular UL grant:
  determining a power amount, regularPwr, transmitted by the wireless device to transmit the regular UL grant; and
  incrementing the UL scheduling aggressiveness parameter by an amount equal to the product of upStep and regularPwr.

19. The network node of claim 17, wherein the determination of total wasted UL grant power and total regular UL grant power is based on power headroom report (PHR) reported by the wireless device.

20. The network node of claim 12, wherein the determination of the UL scheduling aggressiveness parameter is further based on outputs generated by one of an integral controller and proportional-integral-derivative (PID) controller.

21. The network node of claim 12, wherein the determined UL scheduling aggressiveness parameter is further based on one of a plurality of predefined classes of wireless device users.

22. The network node of claim 12, wherein determining the UL scheduling aggressiveness parameter further comprises:

adjusting the UL scheduling aggressiveness parameter to be within a configurable range for every received UL grant.

* * * * *